(12) United States Patent
Sandstrom et al.

(10) Patent No.: US 9,212,275 B2
(45) Date of Patent: Dec. 15, 2015

(54) TIRE WITH TREAD COMPRISED OF FUNCTIONALIZED ELASTOMER AND PRE-TREATED SILICA

(71) Applicants: Paul Harry Sandstrom, Cuyahoga Falls, OH (US); John Joseph Andre Verthe, Kent, OH (US); William Paul Francik, Bath, OH (US); Kenneth William Smesko, Uniontown, OH (US)

(72) Inventors: Paul Harry Sandstrom, Cuyahoga Falls, OH (US); John Joseph Andre Verthe, Kent, OH (US); William Paul Francik, Bath, OH (US); Kenneth William Smesko, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 434 days.

(21) Appl. No.: 13/627,516

(22) Filed: Sep. 26, 2012

(65) Prior Publication Data

US 2014/0088224 A1    Mar. 27, 2014

(51) Int. Cl.
| | |
|---|---|
| C08L 9/06 | (2006.01) |
| B60C 1/00 | (2006.01) |
| C08K 3/04 | (2006.01) |
| C08K 3/36 | (2006.01) |
| C08K 7/02 | (2006.01) |
| C08K 9/06 | (2006.01) |
| C08L 9/00 | (2006.01) |

(52) U.S. Cl.
CPC .................. *C08L 9/06* (2013.01); *B60C 1/0016* (2013.04); *C08K 3/04* (2013.01); *C08K 3/36* (2013.01); *C08K 7/02* (2013.01); *C08K 9/06* (2013.01); *C08L 9/00* (2013.01)

(58) Field of Classification Search
CPC .............. C08L 9/06; B60C 1/00; C08K 3/04; C08K 3/36

USPC .............. 524/35, 34, 575, 526, 511, 514, 513
See application file for complete search history.

(56) References Cited

U.S. PATENT DOCUMENTS

| | | | |
|---|---|---|---|
| 3,517,722 A | 6/1970 | Endter et al. | 152/359 |
| 4,474,908 A | 10/1984 | Wagner | 523/213 |
| 5,064,901 A | 11/1991 | Machado | 525/92 |
| 5,698,619 A | 12/1997 | Cohen et al. | 524/188 |
| 5,780,538 A | 7/1998 | Cohen et al. | 524/494 |
| 6,127,468 A | 10/2000 | Cruse et al. | 524/225 |
| 6,573,324 B1 | 6/2003 | Cohen et al. | 524/492 |
| 6,936,669 B2 | 8/2005 | Halasa et al. | 526/260 |
| 2005/0009955 A1 | 1/2005 | Cohen | 523/212 |
| 2006/0021688 A1 * | 2/2006 | Sandstrom | 152/209.4 |

FOREIGN PATENT DOCUMENTS

| | | | |
|---|---|---|---|
| EP | 1312581 | 5/2003 | C01B 33/12 |
| EP | 1459907 | 9/2004 | B60C 11/00 |
| EP | 2072281 | 6/2009 | B60C 1/00 |
| EP | 2072281 A1 * | 6/2009 | |
| EP | 2213477 | 8/2010 | B60C 1/00 |
| WO | 2007/047943 | 4/2007 | B60C 1/00 |

OTHER PUBLICATIONS

European Search Report received by Applicants Dec. 5, 2013.

* cited by examiner

*Primary Examiner* — Ling Choi
*Assistant Examiner* — Ronald Grinsted
(74) *Attorney, Agent, or Firm* — Henry C. Young, Jr.

(57) ABSTRACT

The invention relates to a rubber composition and tire with tread thereof containing a functionalized elastomer and reinforcement comprised of rubber reinforcing carbon black and a combination of pre-hydrophobated precipitated silica and at least one of hydrophilic precipitated silica together with at least one of short fibers and resin product of methylene acceptor and methylene donor or hydrophilic precipitated silica having been hydrophobated in situ within the rubber composition by a silica coupling agent, optionally together with at least one of reinforcement additive comprised of short fibers and reinforcement additive comprised of resin product of methylene acceptor and methylene donor.

2 Claims, No Drawings

TIRE WITH TREAD COMPRISED OF FUNCTIONALIZED ELASTOMER AND PRE-TREATED SILICA

FIELD OF INVENTION

The invention relates to a tire with tread of a rubber composition containing a functionalized elastomer having functional groups reactive with precipitated silica and pre-hydrophobated precipitated silica.

BACKGROUND OF THE INVENTION

Rubber compositions for components of various articles of manufacture, including tires, conventionally contain at least one diene-based elastomer where the rubber composition may be reinforced with reinforcing filler such as, for example, at least one of carbon black and precipitated silica, namely an amorphous synthetic silica which contains hydroxyl groups on its surface.

It is recognized that the precipitated silica is hydrophilic in nature which promotes filler-filler interaction (e.g. precipitated silica particle-precipitated particle interaction) within the rubber composition and tends to resist filler-polymer interaction (precipitated silica-diene based elastomer interaction) within the rubber composition to thereby challenge dispersion of the precipitated silica particles within the rubber composition. Such phenomenon is well known to those having skill in such art.

The hydrophilic precipitated silica is conventionally coupled to the diene-based elastomer(s) in the rubber composition by use of a silica coupler, or silica coupling agent, having a moiety, such as for example an alkoxysilane component, reactive with hydroxyl groups (e.g. silanol groups) on the precipitated silica and another, different, moiety such as for example a sulfur containing component which is, or becomes, interactive with the diene-based elastomer(s) in the rubber composition. Such coupling of precipitated silica to promote reinforcement of a rubber composition is well known to those having skill in such art.

Reduced filler-filler interaction is promoted by pre-hydrophobating the hydrophilic precipitated silica by pre-treating the precipitated silica prior to its addition to the rubber composition with at least one of alkylsilane, alkoxysilane and aforesaid silica coupling agent containing an alkoxysilane to react with hydroxyl groups on the precipitated silica. A portion of the hydroxyl groups on the precipitated silica are therefore pre-obligated with the alkylsilane groups which will not couple or bond to a diene based polymer. Where the pre-treatment also contains a silica coupling agent, the pre-treated precipitated silica may interact directly with diene-based elastomer(s) via the contained coupling agent on the precipitated silica without addition of a silica coupling agent to the rubber composition itself. Use of such pre-treated, or pre-hydrophobated, precipitated silica to promote better filler-polymer interaction within a rubber composition is well known to those having skill in such art.

Improved filler-polymer interaction may also be promoted by use of a functionalized diene based elastomer containing functional groups reactive with hydroxyl groups on the precipitated silica. In this manner the functional groups on the elastomer may be relied upon to react with hydroxyl groups on the precipitated silica to thereby promote its coupling to the diene-based functionalized elastomer(s) in the rubber composition. Therefore, an added silica coupling agent may or may not be used to aid in coupling the precipitated silica to the diene based elastomer(s) in the rubber composition.

It is readily envisioned that such pre-treated precipitated silica having been pre-treated with a silica coupling agent may be used to promote filler-polymer interaction in a rubber composition containing a functionalized diene-based elastomer with functional groups reactive with hydroxyl groups on the pre-treated precipitated silica.

However, it is also readily envisioned that a portion of hydroxyl groups of the pre-treated precipitated silica has been pre-obligated by reaction with the silica coupling agent and also the hydrophobating alky silane groups. Therefore, the functional groups on the functionalized diene-based elastomer in the rubber composition will compete with the fewer remaining free hydroxyl groups on the precipitated silica which is considered to significantly alter or reduce the ability of the functionalize polymer to interact effectively with the already pre-treated silica surface and effectively reduce the silica coupling density in such a rubber composition which contains both pre-treated silica and functionalized diene-based polymers.

Accordingly, this invention relates to a rubber compositions containing a functionalized elastomer having functional groups intended to react with hydroxyl groups contained on precipitated silica reinforcement to aid in coupling the precipitated silica with the elastomer and to thereby promote reinforcement of the elastomer with the precipitated silica, where its available hydroxyl groups for such purpose have been significantly diminished, or reduced, by pre-hydrophobation (pre-treatment) of the precipitated silica with a silica coupling agent, which may include an alkylsilane or alkoxysilane, which are considered to be reactive with hydroxyl groups on the precipitated silica.

Therefore, the invention particularly relates to rubber compositions containing such functionalized elastomer and precipitated silica reinforcement which has been pre-hydrophobated prior to addition to the rubber composition.

It is important to appreciate that precipitated silica is typically hydrophilic in nature and thereby does not mix efficiently with diene-based elastomers and diene elastomer-containing rubber compositions. Such hydrophilic precipitated silica particles generally favor agglomerating together by mutual attraction between its particles within the rubber composition which promotes filler-to-filler interaction instead of filler-to-elastomer interaction which thereby renders an inefficient mixing of the hydrophilic precipitated silica with the rubber composition. Such phenomena is well known to those having skill in such art.

Therefore, there is an inherent motivation to hydrophobate (e.g. pre-hydrophobate) such hydrophilic precipitated silica to render it more compatible with the elastomer(s) and to therefore promote filler-to-elastomer interaction and thereby more efficient mixing with diene-based elastomers.

Hydrophilic precipitated silica may be hydrophobated, for example, by treatment with various alkoxysilane containing compounds, for example silica coupling agents, which react with hydroxyl groups on the precipitated silica in situ within such rubber compositions. Alkoxysilane based compounds which are not silica coupling agents may also be used for such purpose.

Alternatively, the hydrophilic precipitated silica may be hydrophobated by pre-treatment with various alkoxysilane based silica coupling agents, alkoxysilanes which are not silica coupling agents, or their combination, to render the precipitated silica more hydrophobic prior to introduction to such rubber compositions. For example, and not intended to be limiting, see U.S. Pat. No. 5,698,619.

In one aspect, it has been observed that such pre-hydrophobation of the precipitated silica with a combination of alkoxyorganomercaptosilane and alkylsilane (e.g. alkoxysilane) prior to its addition to the uncured rubber composition has dramatically reduced the resulting low strain stiffness of sulfur cured rubber composition in a sense of reducing its storage modulus (G') at strains below 50 percent as compared to a rubber composition containing the functionalized elastomer where the precipitated silica is hydrophobated in situ within the rubber composition instead of being pre-hydrophobated prior to addition to the rubber composition.

Accordingly, a challenge is presented for undertaking an evaluation of how to enhance (increase) such low strain stiffness property of the rubber composition containing the functionalized elastomer and the pre-hydrophobated silica. Several approaches to achieve this desired increase in low strain stiffness without significant loss of laboratory properties predictive of rolling resistance for a tire tread rubber composition are listed in the following paragraphs: In some cases the separate technologies of each may be combined to give the best overall approach.

A first embodiment of this evaluation is an inclusion of a hydrophilic precipitated silica in such functionalized elastomer-containing rubber composition to create dual precipitated silica moieties in the rubber composition, namely a combination of pre-hydrophobated precipitated silica and hydrophilic precipitated silica (precipitated silica which has not been pre-hydrophobated) where functional groups on the functionalized elastomer is first allowed to react with hydroxyl groups on the hydrophilic precipitated silica and thereafter allowed to react with remaining hydroxyl groups on said hydrophobic (hydroxyl groups remaining on the precipitated silica after it had been pre-hydrophobated) precipitated silica (in the absence of added silica coupling agent to the rubber composition).

By this embodiment, it is believed that a novel reinforcement network containing the pre-hydrophobated precipitated silica can be created for the functionalized elastomer-containing rubber composition, particularly for the benefit of a tire tread of such rubber composition. This results from the functionalized elastomer being the only bonding mechanism to the added hydrophilic silica, since no coupling agent is present to bond the elastomer to the silica, independent of the functional group on the elastomer.

Historically, various rubber compositions, and tires with components thereof, have been proposed which contain dual precipitated silicas in a form of a combination of pre-hydrophobated precipitated silica together with precipitated silica which is hydrophobated in situ within the rubber composition with an added silica coupling agent. For example, and not intended to be limiting, see U.S. Pat. Nos. 4,474,908, 5,780,538, 6,127,468 and 6,573,324 and U.S. Patent Application No. 2005/0009955. However, it is believed that this step-wise interaction with hydrophilic and hydrophobic precipitated silicas of the said first embodiment is a significant departure from such past practice.

A second embodiment of this evaluation is an inclusion of a hydrophilic precipitated silica (precipitated silica which has not been pre-hydrophobated) and a silica coupling agent in such functionalized elastomer-containing rubber composition to create dual precipitated silica moieties in the rubber composition, namely a combination of pre-hydrophobated precipitated silica and hydrophilic precipitated silica where functional groups on the functionalized elastomer first allowed to react with hydroxyl groups of the pre-hydrophobated silica and thereafter allowed to react with hydroxyl groups on the hydrophilic precipitated silica, where the silica coupling agent is allowed to react with hydroxyl groups contained on both the pre-hydrophobated precipitated silica and the added hydrophilic precipitated silica.

By this embodiment, it is believed that a novel reinforcement network containing the combination of silica coupler reacted pre-hydrophobated and added hydrophilic precipitated silica can be created for the functionalized elastomer-containing rubber composition, particularly for the benefit of a tire tread of such rubber composition.

A third embodiment of this evaluation is to combine short fiber reinforcement together with the functionalized elastomers with either of the aforesaid first and second embodiments to promote an enhancement of (an increase in) the low strain stiffness properties of the rubber composition while substantially maintaining cured physical properties of the rubber composition to promote an improved (promote a reduction of) rolling resistance for tires when such rubber compositions are used in tire tread applications. Historically, short fiber reinforcement has been used in various rubber compositions, including rubber compositions for tire treads. However, this proposed use of such short fibers is believed to be a significant departure from such prior use of short fibers in a rubber composition blend which contains functionalized elastomers combined with pre-hydrophobated silica. One might envision the addition of hydrophilic precipitated silica to such blended rubber compositions as described in the first embodiment of this invention. Thus one could have a rubber composition comprised of functionalized elastomer capable of bonding to a combination of pre-hydrophobated silica (a precipitated silica having been pre-treated prior to its addition to an internal rubber mixer) and hydrophilic silica (precipitated silica without pre-treatment) combined with an addition of short fibers. Such short fibers may be in a form of, for example, individual fibers or chopped cord of a plurality of fibers. Such short fibers may be comprised of at least one of natural and synthetic fibers such as, for example, at least one of nylon, aramid, polyester, rayon, cellulose and cotton.

A fourth embodiment of this invention is to add an in situ formed resin to the rubber of any of the foresaid first, second and third embodiments as a product of a combination of methylene donor and methylene acceptor. Historically, resin products of a methylene donor and methylene acceptor formed in situ within a rubber composition has been proposed in various rubber compositions, including rubber compositions for tire treads, However, it is believed that their inclusion in any of the aforesaid first, second and third embodiments is a signification departure from such past practice. Examples of methylene donor and methylene acceptor systems are discussed in U.S. Pat. No. 3,517,722. Representative of methylene donors are, for example, hexamethylenetetramine and hexamethoxymethylmelamine. Representative of methylene acceptors are, for example, resorcinol, resorcinol monobenzoate, phenolic cashew nut oil resin, polyhydric phenoxy resin and reactive phenol/formaldehyde resin.

It is therefore a special challenge to evaluate the inclusion of at least one or a combination of the following materials as described in the different embodiments in a rubber composition containing a functionalized diene-based elastomer and pre-hydrophobated silica to determine their impact on low strain stiffness, desirably to promote its increase, and also its rebound property, which would desirably be maintained or improved (reduction in) rolling resistance performance in tires when such rubber compositions are used in tire treads, particularly:

(A) combination of sequentially added hydrophilic and pre-hydrophobated precipitated silica (B) combination of sequentially added hydrophilic and pre-hydrophobated precipitated silica together with a silica coupling agent, (C) short fiber reinforcement in a form of dispersion of discrete short fibers, with or without added hydrophilic precipitated silica and with or without added silica coupling agent, and (D) resin product of a methylene donor and methylene acceptor formed in situ in the rubber composition, with or without added hydrophilic precipitated silica and with or without added silica coupling agent and with or without discrete short fibers.

In the description of this invention, the term "phr" relates to parts by weight for a material or ingredient per 100 parts by weight elastomer(s)". The terms "rubber" and "elastomer" may be used interchangeably unless otherwise indicated. The terms "cure" and "vulcanize" may be used interchangeably unless otherwise indicated.

SUMMARY AND PRACTICE OF THE INVENTION

In accordance with this invention, a rubber composition is comprised of, based upon parts by weight per 100 parts by weight of rubber (phr):

(A) 100 phr of at least one diene-based elastomer comprised of:
  (1) at least one functionalized diene-based elastomer, or
  (2) combination of at least one functionalized diene-based elastomer and at least one non-functionalized diene-based elastomer where said combination contains greater than 50 percent (by weight) of said functionalized diene-based elastomer(s), and (B) about 30 to about 120 phr of reinforcing filler comprised of:
  (1) precipitated silica, or
  (2) a combination of precipitated silica and rubber reinforcing carbon black containing up to about 65 phr of rubber reinforcing carbon black;
  wherein said precipitated silica is comprised of:
    (a) pre-hydrophobated precipitated silica (precipitated silica hydrophobated prior to its addition to the rubber composition) and, optionally, a silica coupling agent added to said rubber composition, or
    (b) combination of pre-hydrophobated precipitated silica and hydropohilic precipitated silica and, optionally, a silica coupling agent added to said rubber composition,
  wherein said pre-hydrophobated precipitated silica is hydrophobated prior to its addition to the rubber composition by treatment with:
    (i) at least one of an alkylsilane and alkoxysilane, particularly an alkoxysilane, or
    (ii) a combination of at least one of an alkylsilane and alkoxysilane (particularly an alkoxysilane) together with at least one of an organoalkoxysilyl polysulfide and organomercaptoalkoxysilane, or
    (iii) at least one of an organoalkoxysilyl polysulfide and organomercaptoalkoxysilane,
  wherein said hydropohilic precipitated silica is optionally hydrophobated in situ within the rubber composition is hydrophobated by treatment within the rubber composition with:
    (iv) at least one of an alkylsilane and alkoxysilane, particularly an alkoxysilane, or
    (v) a combination of at least one of an alkylsilane and alkoxysilane (particularly an alkoxysilane) together with an alkoxysilane and at least one of an organoalkoxysilyl polysulfide and organomercaptoalkoxysilane, or
    (vi) at least one of an organoalkoxysilyl polysulfide and organomercaptoalkoxysilane, and
  wherein said additional diene-based elastomer is comprised of at least one polymer of at least one of isoprene and 1,3-butadiene and copolymers of styrene and at least one of isoprene and 1,3-butadiene; and
  wherein said functionalized elastomer is comprised of at least one of functionalized cis 1,4-polyisoprene elastomer (functionalized IR), functionalized cis 1,4-polybutadiene elastomer (functionalized BR), functionalized styrene/butadiene copolymer elastomer (functionalized SBR), functionalized isoprene/butadiene copolymer elastomer (functionalized IBR) and functionalized styrene/isoprene/butadiene (functionalized SIBR) and tin coupled organic solvent solution prepared elastomers of at least one of isoprene and 1,3-butadiene and styrene with at least one of isoprene and 1,3-butadiene, where functional groups of said elastomers are reactive with hydroxyl groups of precipitated silica.

In one embodiment, said rubber composition further contains at least one additive comprised of at least one of:
(A) short fiber reinforcement, and
(B) resin product of methylene donor and methylene acceptor.

Representative examples of said non-functionalized diene-based elastomers are, for example, and not intended to be limiting, cis 1,4-polyisoprene (natural and synthetic, particularly natural rubber), 1,4-polybutadiene (particularly cis 1,4-polybutadiene) and (A) amine functional group reactive with hydroxyl groups on said precipitated silica, or (B) siloxy functional group, including end chain siloxy groups, reactive with hydroxyl groups on said precipitated silica, or (C) combination of amine and siloxy functional groups reactive with hydroxyl groups on said precipitated silica, or (D) combination of thiol and siloxy functional groups reactive with hydroxyl groups on said precipitated silica, or (E) combination of imine and siloxy functional groups reactive with hydroxyl groups on said precipitated silica, or (F) hydroxyl functional groups reactive with said precipitated silica, or (G) epoxy groups reactive with hydroxyl groups on said precipitated silica, or (H) carboxyl groups reactive with hydroxyl groups on said precipitated silica.

In one embodiment, said functionalized elastomer contains functional group(s) comprised of:

For the functionalized elastomers, representative of amine functionalized SBR elastomers are, for example, in-chain functionalized SBR elastomers mentioned in U.S. Pat. No. 6,936,669.

Representative of a combination of amino-siloxy functionalized SBR elastomers with one or more amino-siloxy groups connected to the elastomer is, for example, HPR355™ from JSR and amino-siloxy functionalized SBR elastomers mentioned in U.S. Patent Application Publication No. 2007/0185267.

Representative styrene/butadiene elastomers end functionalized with a silane-sulfide group are, for example, mentioned in WO 2007/047943 patent publication.

Representative of hydroxy functionalized SBR elastomers is, for example, Tufdene 3330™ from Asahi.

Representative of epoxy functionalized SBR elastomers is, for example, Tufdene E50™ from Asahi.

For example, a method of preparation of a precipitated silica reinforced rubber composition for a tire tread is provided which is comprised of at least two preparatory non-productive mixing steps followed by a productive mixing step, which comprises, based upon parts by weight per 100 parts by weight rubber (phr):

(A) blending a pre-hydrophobated precipitated silica with a rubber composition containing at least one conjugated diene-based elastomer including said functionalized elastomer in at least one preparatory non-productive mixing step in an internal rubber mixer, (at a temperature of, for example, in a range of from about 135° C. to about 175° C.);

(B) removing said pre-hydrophobated precipitated silica-containing rubber composition from its internal rubber mixer, (and allowing said rubber composition to thereafter cool to a temperature below about 40° C.);

(C) blending a hydrophilic precipitated silica with said pre-hydrophobated precipitated silica-containing rubber composition in the same mixing step or in at least one different and subsequent preparatory non-productive mixing step (subsequent to said preparatory non-productive mixing step in which said pre-hydrophobated precipitated silica is added) in an internal rubber mixer, (in the absence of addition of a silane-containing hydrophobating agent for said hydrophilic precipitated silica) to form a rubber composition which contains dual silica moieties in a form of a combination of said pre-hydrophobated precipitated silica and said hydrophilic precipitated silica, wherein said pre-hydrophobated silica is hydrophobated prior to its addition to said rubber composition with at least one hydrophobtaining agent comprised of an alkoxysilane, organosiloxysilyl polysulfide and organomercaptoalkoxysilane.

For example, a method of preparation of a precipitated silica reinforced rubber composition for a tire tread is provided comprised of at least one preparatory non-productive mixing step followed by a productive mixing step, which comprises, based upon parts by weight per 100 parts by weight rubber (phr):

(A) blending a pre-hydrophobated precipitated silica with a rubber composition containing at least one conjugated diene-based elastomer including said functionalized elastomer in at least one preparatory non-productive mixing step in an internal rubber mixer, (at a temperature of, for example, in a range of from about 135° C. to about 175° C.);

(B) blending a hydrophilic precipitated silica with said pre-hydrophobated precipitated silica-containing rubber composition in the same or different non-productive mixing step (before or after the addition of said pre-hydrophobated silica) in an internal rubber mixer, (in the absence of addition of a silane-containing hydrophobtaining agent for said hydrophilic additional precipitated silica) to form a rubber composition which contains dual silica moieties in a form of a combination of said pre-hydrophobated precipitated silica and said hydrophilic precipitated silica, wherein said pre-hydrophobated silica is hydrophobated prior to its addition to said rubber composition with at least one hydrophobating agent comprised of an alkoxysilane, alkoxysilane, organosiloxysilyl polysulfide and organomercaptoalkoxysilane.

In practice, the mixing of the hydrophilic precipitated silica with at least one diene-based elastomer including said functionalized elastomer can be administered for example:

(A) in the same non-productive mixing step before or after the addition of the pre-hydrophobated precipitated silica, or (B) in a separate non-productive mixing step following the addition of the pre-hydrophobated precipitated silica, or (C) in a separate non-productive mixing step following the addition of the pre-hydrophobated precipitated silica with an additional separate non-productive mixing step therebetween, or (D) in a separate, subsequent productive mixing step in which sulfur and sulfur curatives are added to the rubber composition.

In practice, as hereinbefore indicated, said hydrophobating agent for pre-hydrophobating said hydrophilic precipitated silica for the purposes of this invention, is at least one of alkylsilane, alkoxysilane, organosiloxysilyl polysulfide and organomercaptoalkoxysilane, alternately with a combination of alkoxysilane and at least one of said organosiloxysilyl polysulfide or organomercaptoalkoxysilane.

In practice, representative of said organoalkoxysilyl polysulfides is, for example, a bis(3-trialkoxysilylpropyl) polysulfide having an average of from about 2 to about 4, optionally an average in a range of from about 2 to about 2.6, or in a range of from about 3.2 to about 3.8, sulfur atoms in its polysulfidic bridge. Exemplary of said bis(3-trialkoxysilylalkyl)polysulfide is comprised of a bis(3-triethoxysilylpropyl) polysulfide.

In practice, representative of said alkoxysilane is, for example, an alkoxysilane of the general formula (I):

$$Z_n\text{—}Si\text{—}R_{4-n} \qquad (I)$$

wherein R is a saturated alkyl radical having from one to 18, preferably from one to 8, carbon atoms such as, for example, methyl, ethyl, isopropyl, n-butyl and octadecyl radicals, n is a value of from 1 to 3 and Z is an alkoxy radical represented as $(R^1O)\text{—}$, wherein $R^1$ is a saturated alkyl radical having from one to 3 carbon atoms such as, for example, methyl, ethyl and isopropyl radicals, preferably at least one of methyl and ethyl radicals.

Representative examples of alkoxysilanes of Formula (I) are, for example, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

Accordingly, said alkoxysilanes have an alkoxy group being reactive with the hydroxyl groups (e.g. silanol groups) contained on the surface of the precipitated silica aggregates.

In the practice of this invention, the rubber composition may be comprised of various conjugated diene-based elastomers in addition to said functionalized elastomer. Such additional diene-based elastomers may be, for example, at least one of polymers comprised of at least one of isoprene and 1,3-butadiene, and copolymers of styrene and at least one conjugated diene hydrocarbon comprised of isoprene and 1,3-butadiene, as well as tin coupled organic solution polymerization prepared elastomers.

For example, representative of such additional elastomers are natural cis 1,4-polyisoprene rubber, synthetic cis 1,4-polyisoprene rubber, c is 1,4-polybutadiene rubber, high vinyl polybutadiene rubber having a vinyl 1,2 content in a range of about 10 percent to about 90 percent, styrene/butadiene copolymer (SBR) rubber (aqueous emulsion or organic solution polymerization prepared copolymers) and including organic solvent polymerization prepared SBR having a vinyl 1,2-content in a range of about 10 to about 90 percent based on its polybutadiene derived portion and a polystyrene content in a range of about 10 to about 60 percent based upon the copolymer, styrene/high trans 1,4-butadiene copolymer rubber having a trans-1,4 content in the range of about 40 to about 80 percent based on its polybutadiene derived portion, styrene/isoprene/butadiene terpolymer rubber, butadiene/acrylonitrile rubber, styrene/isoprene copolymer and isoprene/butadiene copolymer rubber, 3,4-polyisoprene rubber and trans 1,4-polybutadiene rubber.

Further representative examples of such additional elastomers are, for example, organic solution polymerization prepared tin or silicon coupled elastomers such as for example, tin or silicon coupled styrene/butadiene copolymers may also be used.

Tin coupled copolymers of styrene/butadiene may be prepared, for example, by introducing a tin coupling agent during the styrene/1,3-butadiene monomer copolymerization reaction in an organic solvent solution, usually at or near the end of the polymerization reaction. Such coupling of styrene/butadiene copolymers is well known to those having skill in such art.

For such coupled elastomers, it is usually desired that at least 50 percent and more generally in a range of about 60 to about 85 percent of the Sn (tin) bonds in the tin coupled elastomers are bonded to butadiene units of the styrene/butadiene copolymer to create Sn-dienyl bonds such as butadienyl bonds.

Creation of tin-dienyl bonds can be accomplished in a number of ways such as, for example, sequential addition of butadiene to the copolymerization system or use of modifiers to alter the styrene and/or butadiene reactivity ratios for the copolymerization. It is believed that such techniques, whether used with a batch or a continuous copolymerization system, is well know to those having skill in such art.

Various tin compounds, particularly organo tin compounds, may be used for the coupling of the elastomer. Representative of such compounds are, for example, alkyl tin trichloride, dialkyl tin dichloride, yielding variants of a tin coupled styrene/butadiene copolymer elastomer, although a trialkyl tin monochloride might be used which would yield simply a tin-terminated copolymer.

Examples of tin-modified, or coupled, elastomers are, for example, styrene/butadiene copolymer elastomers exemplified for example in U.S. Pat. No. 5,064,901.

Various commercially available amorphous synthetic precipitated silicas (precipitated silicas) may be used for the precipitated silicas for this invention. Such silicas may be characterized, for example, by their BET and CTAB surface areas. Representative of such silicas, for example only and without limitation, are silicas from PPG Industries under the Hi-Sil trademark with designations 210, 243, etc.; silicas from Rhodia, with designations of Zeosil 1165MP and Zeosil 165GR, silicas from Evonic with designations VN2 and VN3, and silicas from Huber such as Zeopol 8745 and Zeopol 8715.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins and plasticizers, fillers, pigments, fatty acid, zinc oxide, waxes, antioxidants and antiozonants, peptizing agents and reinforcing materials.

The presence and relative amounts of the above additives are not considered to be an aspect of the present invention, unless otherwise indicated, which is more primarily directed to a tire with a tread, including the tread running surface, of a rubber composition containing dual silica moieties in a form of a pre-hydrophobated precipitated silica and hydropohilic precipitated silica in combination with a functionalized elastomer containing functionalities reactive with hydroxyl groups (e.g. silanol groups) on the precipitated silica.

The tires can be built, shaped, molded and cured by various methods which will be readily apparent to those having skill in such art.

The following Example is provided to further understand the invention. The parts and percentages are by weight unless otherwise indicated.

EXAMPLE I

Control and Comparative Rubber Sample

Experiments were conducted to evaluate the effect of using a combination of hydrophilic precipitated silica hydrophobated in situ in an internal rubber mixer (e.g. Banbury mixer) using an added silica coupling agent as compared to a pre-hydrophobated precipitated silica without added hydrophilic silica or addition of a silica coupling agent within a rubber composition rubber which contains a functionalized elastomer. This example will set the issues of this approach as to obtaining a rubber composition for tread component applications in a tire where a dramatic improvement in (reduction in) rolling resistance can be obtained with a corresponding reduction of low strain stiffness property which might negatively impact wet and dry handling performance of the tire.

The functional groups of the functionalized elastomer are understood to be reactive with available hydroxyl groups on the precipitated silicas.

Rubber composition A (control rubber sample) represents the addition of hydrophilic precipitated silica in the presence of silica coupling agent to a rubber composition containing a functionalized SBR (styrene/butadiene rubber) polymer and a non-functionalized PBD (cis 1,4-polybutadiene rubber) polymer. Sample B (comparative rubber sample) represents the use of a pre-hydrophobated precipitated silica added to the same polymer blend in the absence of any added silica coupling agent.

The rubber compositions, rubber Sample A and rubber Sample B, were prepared by mixing the elastomers with the precipitated silica fillers and silica coupling agent, when added, in at least one initial non-productive mixing step followed by one sequential non-productive mixing stage (NP) in an internal rubber mixer (Banbury rubber mixer) for about 4 minutes to a temperature of about 160° C. The rubber compositions were subsequently mixed in a productive mixing stage (P) in an internal rubber mixer (Banbury mixer) with a sulfur cure package, namely sulfur and sulfur cure accelerator(s), for about 2 minutes to a drop temperature of, for example, about 115° C. The rubber compositions were removed from the internal mixer after each mixing step and cooled to below 40° C. between each individual non-productive mixing stage and before the final productive mixing stage.

The basic formulation for the Control rubber Sample A and Comparative rubber Sample B is presented in the following Table 1 expressed in parts by weight per 100 parts of rubber (phr) unless otherwise indicated.

TABLE 1

| | Parts by weight (phr) |
|---|---|
| First Non-Productive Mixing Stage (NP1) | |
| Functionalized SBR elastomer[1] | 60 |
| Natural cis 1,4-polyisoprene rubber[2] | 40 |
| Hydrophobated (pre-treated) precipitated silica[3] | 0 and 84 |
| Hydrophilic (not pre-treated) precipitated silica[4] | 80 and 0 |
| Processing oil, aids and wax | 22 |
| Coupling agent[5] | 6.4 and 0 |
| Antidegradant(s)[6] | 2 |
| Carbon black, added, rubber reinforcing[7] | 3 |
| Fatty acid[8] | 2 |
| Zinc oxide | 3 and 0.5 |
| | (for rubber Sample B) |
| Productive Mixing Stage (P) | |
| Sulfur | 1.5 |
| Accelerator(s)[9] | 2.9 and 4.2 |
| | (for rubber Sample B) |

[1]A tin-coupled solution polymerization prepared styrene/butadiene elastomer containing an end chain siloxyl (siloxy) functional group reactive with hydroxyl groups of a precipitated silica
[2]Cis 1,4-polyisoprene natural rubber (TRS20)
[3]Pre-hydrophobated (pre-treated) precipitated silica with a combination of mercaptoalkoxysilane and alkylsilane (e.g. alkoxysilane) as Agilon 400 ™ from PPG Industries
[4]Hydrophilic (not pre-hydrophobated) precipitated silica as Zeosil 1165MP ™ from Rhodia
[5]Coupling agent as a bis(3-triethoxysilylpropyl) polysulfide having an average of about 2 to about 2.6 connecting sulfur atoms in its polysulfidic bridge as Si-266 ™ from Evonic
[6]Amine based antidegradants
[7]N299 rubber reinforcing carbon black, an ASTM designation
[8]Primarily comprised of stearic, palmitic and oleic acids
[9]Sulfenamide and guanidine sulfur cure accelerators The following Table 2 illustrates cure behavior and various physical properties of rubber compositions based upon the basic recipe of Table 1 and reported herein as a Control rubber Sample A and Comparative rubber Sample B. Where cured rubber samples are examined, such as for the stress-strain, hot rebound and hardness values, the rubber samples were cured for about 12 minutes at a temperature of about 170° C.

TABLE 2

| | Samples | |
|---|---|---|
| | Control A | Comparative B |
| Materials (phr) | | |
| Functionalized SBR elastomer | 60 | 60 |
| Hydrophilic (not pre-hydrophobated) silica | 80 | 0 |
| Pre-hydrophobated silica | 0 | 84 |
| Silica coupling agent | 6.4 | 0 |
| Properties | | |
| Tire Tread Predictive Handling Properties, Cured storage modulus (G')[1] at 100° C., 11 Hertz (RPA)[1] | | |
| 1 percent strain (MPa) | 5116 | 1300 |
| 10 percent strain (MPa) | 2145 | 1070 |
| Tire Tread Rolling Resistance Predictive Properties (Higher values for rebound and lower values for Tan Delta are predictive of beneficial reduction in tire rolling resistance) | | |
| Rebound (100° C.) | 58 | 64 |
| Tan delta, (100° C., 10% strain, 11 Hertz) | 0.17 | 0.12 |
| Tire Tread Predictive Wet Performance Properties | | |
| Rebound, 0° C. | 9.7 | 9.3 |
| Tire Treadwear Predictive Property, Abrasion Resistance (Rate of abrasion, Lower is better) | | |
| Grosch abrasion[2], Medium, mg/km | 126 | 85 |
| Tear Strength[3], (peal adhesion) N | | |
| At 95° C. for testing | 82 | 56 |

[1]Data according to Rubber Process Analyzer (RPA)
[2]Grosch abrasion rate - LAT-100 Abrader measured in terms of mg/km of rubber abraded away. The test rubber sample is placed at a slip angle under constant load (Newtons) as it traverses a given distance on a rotating abrasive disk (e.g. disk from HB Schleifmittel GmbH). In practice, a Low abrasion severity test may be run, for example, at a load of 20 Newtons, 2° slip angle, disk speed of 40 km/hr for a distance of 7,500 meters; a Medium abrasion severity test may be run, for example, at a load of 40 Newtons, 6° slip angle, disk speed of 20 km/hr and distance of 1,000 meters; a High abrasion severity test may be run, for example, at a load of 70 Newtons, 12° slip angle, disk speed of 20 km/hr and distance of 250 meters; and an Ultra High abrasion severity test may be run, for example, at a load of 70 Newtons, 16° slip angle, disk speed of 20 km/hr and distance of 500 meters.
[3]Data obtained according to a tear strength (peal adhesion) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument at 95° C. and reported as Newtons force.

It can be seen in Table 2 that comparative Sample B, which contains the pre-hydrophobated silica in the presence of a functionalized SBR elastomer provides a dramatic improvement in rebound and tan delta that would predict a significant improvement in tire rolling resistance when such a compound is used in a tire tread component.

In contrast the same comparative Sample B, which contains the pre-hydrophobated silica and functionalized SBR shows a dramatic reduction in low strain stiffness properties at 1 and 10 percent strain which would predict a significant loss of wet and dry handling performance. The challenge thus becomes to modify Comparative Sample B in such a way to maintain the predictive improvement in rolling resistance, while improving the compounds performance predictive of good wet and dry handling. The following examples will show the material approaches that were attempted to reach this goal.

EXAMPLE II

Experiments were conducted to evaluate the effect of adding hydrophilic, not pre-treated, precipitated silica to the pre-hydrophobated, (pre-treated), precipitated silica in the internal rubber mixer (Banbury mixer) without addition of silica coupling agent to the compounds (rubber composition Samples). Control rubber Sample C contained 84 phr of the pre-treated silica, whereas rubber Samples D, E and F contained in addition to the 84 phr of the pre-treated silica, 5, 10 and 15 phr, respectively, of the not-pretreated, therefore hydrophilic, precipitated silica.

This example represents an attempt to increase the low strain stiffness of the compound containing pre-treated (pre-hydrophobated) precipitated silica by the addition of various levels of not-treated (therefore hydrophilic) precipitated silica, without the addition of silica coupling agent. The success of this approach and others listed in the following examples demonstrates an ability to increase low strain stiffness, without a significant penalty to hysteresis, to the rubber composition for which a lower hysteresis of the rubber composition is desired to promote an improvement in (lower) tire rolling resistance for the tire with a tread of such rubber composition.

The rubber composition (rubber compound) base is illustrated in the following Table 3 where the parts and percentages are reported in terms parts by weight unless otherwise indicated.

TABLE 3

| First Non-Productive Mixing Stage (NP1) | Parts by weight (phr) |
|---|---|
| Functionalized SBR rubber[1] | 60 |
| Natural rubber[2] | 40 |
| Hydrophilic (not pre-treated) precipitated silica[3] | 0, 5, 10, 15 |
| Pre-hydrophobated precipitated silica[4] | 84, 84, 84, 84 |

Ingredients used are as identified in Table 1 of Example I except for amounts and unless otherwise identified.

The following Table 4 illustrates cure behavior and various physical properties of the rubber compositions based upon the compounds of Table 3. Where cured rubber samples are examined, such as for the stress-strain, hot rebound and hardness values, the rubber samples were cured for about 12 minutes at a temperature of about 170° C.

TABLE 4

| | Samples (phr) | | | |
|---|---|---|---|---|
| | C | D | E | F |
| Materials (phr) | | | | |
| Functionalized SBR elastomer | 60 | 60 | 60 | 60 |
| Hydrophilic (not pre-treated) precipitated silica | 0 | 5 | 10 | 15 |
| Pre-hydrophobated precipitated silica | 84 | 84 | 84 | 84 |
| Silica coupling agent | 0 | 0 | 0 | 0 |
| Properties | | | | |
| Tire Tread Predictive Handling Properties | | | | |
| Cured storage modulus (G')[1] | | | | |
| at 100° C., 11 Hertz (RPA)[1] | | | | |
| 1 percent strain (MPa) | 1220 | 1367 | 1599 | 2338 |
| 10 percent strain (MPa) | 1000 | 1076 | 1183 | 1489 |
| Tire Tread Rolling Resistance Predictive Properties | | | | |
| (Higher values for rebound and lower | | | | |
| values for Tan Delta are predictive of | | | | |
| beneficial reduction in tire rolling resistance) | | | | |
| Rebound (100° C.) | 63 | 60 | 59 | 59 |
| Tan delta (100° C., 10% strain, 11 Hertz) | 0.121 | 0.118 | 0.114 | 0.091 |
| Tire Tread Predictive Wet Traction Property | | | | |
| Rebound, 0° C. | 7.3 | 7.6 | 7.7 | 7.8 |
| Tire Treadwear Predictive | | | | |
| Property Abrasion Resistance | | | | |
| (Rate of abrasion) (Lower is better) | | | | |
| Grosch abrasion[2], Medium, mg/km | 53 | 59 | 65 | 74 |
| Tear Strength[3], (peal strength) N | | | | |
| At 95° C. for testing | 61 | 72 | 55 | 64 |

[1, 2, 3]Test procedures as in Example I

It can be seen in Table 4 that the low strain stiffness of rubber Sample (Compound) C, the control, can be significantly increased with only a minor penalty to hysteresis, as indicated by rebound and as indicated by tan delta physical properties, by the addition of low levels of not-treated precipitated silica (therefore hydrophilic precipitated silica), in Compounds (rubber Samples) D, E and F.

This is considered to be significant in a sense that it is seen that an advantage can therefore be taken of the low hysteresis properties of the rubber promoted by the pre-treated precipitated silica (pre-hydrophobated precipitated silica), through small additions of the hydrophilic precipitated silica with a resulting improvement of the low strain stiffness properties which are significant for promoting wet and dry handling tire performance for a tire tread.

EXAMPLE III

Experiments were conducted to evaluate the effect of adding hydrophilic, not pre-treated, precipitated silica to the hydrophobated, pre-treated, precipitated silica in the internal rubber mixer (Banbury mixer) combined with the of coupling agent to the compounds (rubber Samples). Compound (rubber Sample) G, the control, contained 84 phr of the pre-treated precipitated silica (pre-hydrophobated precipitated silica), whereas compound (rubber Sample) H contained 63 phr of the hydrophobated, pre-treated, precipitated silica and 20 phr of the not-pretreated precipitated silica (therefore added hydropohilic precipitated silica) and 1.6 phr of coupling agent. Compound (rubber Sample) I contained 42 phr of the pre-hydrophobated, pre-treated, precipitated silica and 40 phr of the added not-pre-treated precipitated silica (therefore added hydrophilic precipitated silica) and 3.2 phr of coupling agent. All compounds (rubber Samples) contained a total 80 phr of silica.

This example represents an attempt to increase the low strain stiffness of the compound (rubber composition) containing pre-treated precipitated silica (pre-hydrophobated precipitated silica) by the addition of two levels of not-treated precipitated silica (hydrophilic precipitated silica), and the addition of coupling agent. The success of this approach illustrates an ability to increase low strain stiffness, without a significant penalty to hysteresis, which is desired to be low to promote improvement in tire rolling resistance.

The following Table 5 illustrates a base formulation for the First Non-Productive Mixing Stage for the rubber Samples with parts presented by weight.

TABLE 5

| First Non-Productive Mixing Stage (NP1) | Parts by weight (phr) |
|---|---|
| Functionalized SBR rubber[1] | 60 |
| Natural rubber[2] | 40 |
| Hydrophilic (not pre-treated) precipitated silica[3] | 0, 20, 40 |
| Pre-hydrophobated precipitated silica4 | 84, 63, 42 |
| Silica coupling agent[5] | 0, 1.6, 3.2 |

Ingredients used are as identified in Table 1 of Example I except for amounts and unless otherwise identified.

The following Table 6 illustrates cure behavior and various physical properties of the rubber compositions based upon the basic recipe of Table 5. Where cured rubber samples are examined, such as for the stress-strain, hot rebound and hardness values, the rubber samples were cured for about 12 minutes at a temperature of about 170° C.

TABLE 6

| | Samples | | |
|---|---|---|---|
| | G | H | I |
| Materials (phr) | | | |
| Functionalized SBR elastomer | 60 | 60 | 60 |
| Hydrophilic (not pre-treated) precipitated silica | 0 | 20 | 40 |
| Pre-hydrophobated precipitated silica | 84 | 63 | 42 |
| Silica coupling agent | 0 | 1.6 | 3.2 |
| Properties | | | |
| Tire Tread Predictive Handling Properties | | | |
| Cured storage modulus (G')[1] at 100° C., 11 Hertz (RPA)[1] | | | |
| 1 percent strain (MPa) | 1399 | 1803 | 2585 |
| 10 percent strain (MPa) | 1112 | 1341 | 1713 |
| Tire Tread Rolling Resistance Predictive Properties (Higher values for rebound and lower values for Tan Delta are predictive of beneficial reduction in tire rolling resistance) | | | |
| Rebound (100° C.) | 64 | 66 | 65 |
| Tan Delta (100° C., 10% strain, 11 Hertz) | 0.117 | 0.104 | 0.112 |
| Tire Tread Predictive Wet Traction Property | | | |
| Rebound, 0° C. | 8.8 | 8.8 | 9 |
| Abrasion Resistance (Rate of abrasion) (Lower is better) | | | |
| Grosch abrasion[2], Medium, mg/km | 99 | 107 | 117 |
| Tear Strength[3], (peal strength) N | | | |
| At 95° C. for testing | 57 | 66 | 59 |

[1,2,3]Test procedures as in Example I

It can be seen in Table 6 that the low strain stiffness of Compound (rubber Sample) G, the control, can be significantly increased with no penalty to hysteresis as measured by rebound and tan delta by the addition of not-treated precipitated silica (hydrophilic precipitated silica) and coupling agent, for Experimental compounds (rubber Samples) H and I.

This is considered to be significant in a sense that it is seen that an advantage can be taken of the low hysteresis properties promoted by the pre-treated precipitated silica (pre-hydrophobated precipitated silica), while improving the low strain stiffness properties of the rubber composition, which is important for promoting wet and dry handling tire performance for a tire tread.

EXAMPLE IV

Experiments were conducted to evaluate the effect of adding an in situ formed (formed in the rubber composition) resin product of methylene acceptor and methylene donor to the rubber composition containing the functionalized elastomer and:

(A) Combination of pre-treated, (pre-hydrophobated) precipitated silica, or (B) Combination of pre-treated, (pre-hydrophobated) precipitated silica, silica coupling agent and not-treated precipitated silica (hydrophilic precipitated silica).

Rubber Compound (rubber Sample) J, the control, contained 84 phr of the pre-treated (hydrophobated) precipitated silica, whereas compound (rubber Sample) K contained 84 phr of the pre-treated (hydrophobated) precipitated silica and 1.75 phr of an in situ formed resin product of methylene acceptor and methylene donor and compound (rubber Sample) L contained 84 phr of the pre-treated (hydrophobated) precipitated silica combined with 3.5 phr of the resin product. Compound (rubber Sample) M contained 63 phr of the pre-treated (hydrophobic) precipitated silica and 20 phr of the not-pretreated (hydrophilic) precipitated silica and 1.6 phr of coupling agent. Compound (rubber Sample) N was similar to Compound (rubber Sample) M, except it also contained 3.5 phr of the resin product. All compounds (rubber Samples) contained a total 80 phr of precipitated silica.

The following Table 7 illustrates a base formulation for the First Non-Productive Mixing Stage for the rubber Samples with parts presented by weight.

TABLE 7

| First Non-Productive Mixing Stage (NP1) | Parts by weight (phr) |
|---|---|
| Functionalized SBR rubber[1] | 60 |
| Natural rubber[2] | 40 |
| Hydrophilic (not pre-treated) precipitated silica[3] | 0, 0, 0, 20, 20 |
| Pre-hydrophobated precipitated silica4 | 84, 84, 84, 63, 63 |
| Silica coupling agent[5] | 0, 0, 0 1.6, 1.6 |
| Resin product (methylene donor/acceptor)[10] | 0/0, 1/0.75, 2/1.5, 0/0, 2/1.5 |

Ingredients used are as identified in Table 1 of Example I except for amounts and unless otherwise identified.

[10]Methylene acceptor as a reactive phenol/formaldehyde resin as HRJ-15873™ from SI Group, and methylene donor as hexamethoxymethylmelamine resin as Cyrez CRA100™ from Cyrez.

The following Table 8 illustrates cure behavior and various physical properties of the rubber compositions based upon the basic recipe of Table 7. Where cured rubber samples are examined, such as for the stress-strain, hot rebound and hardness values, the rubber samples were cured for about 12 minutes at a temperature of about 170° C.

TABLE 8

| | Samples | | | | |
|---|---|---|---|---|---|
| | J | K | L | M | N |
| Materials (phr) | | | | | |
| Functionalized SBR elastomer | 60 | 60 | 60 | 60 | 60 |
| Hydrophilic (not pre-treated) precipitated silica | 0 | 0 | 0 | 20 | 20 |
| Pre-hydrophobated precipitated silica | 84 | 84 | 84 | 63 | 63 |
| Silica coupling agent | 0 | 0 | 0 | 1.6 | 1.6 |
| Resin (methylene donor/acceptor) | 0/0 | 1/.75 | 2/1.5 | 0/0 | 2/1.5 |
| Tire Tread Predictive Handling Properties Cured storage modulus (G')[1] at 100° C., 11 Hertz (RPA)[1] | | | | | |
| 1 percent strain (MPa) | 1262 | 1422 | 1470 | 1613 | 2054 |
| 10 percent strain (MPa) | 1066 | 1141 | 1159 | 1277 | 1423 |
| Tire Tread Rolling Resistance Predictive Properties (Higher values for rebound and lower values for tan delta are predictive of beneficial reduction in tire rolling resistance) | | | | | |
| Rebound (100° C.) | 63 | 64 | 63 | 62 | 61 |
| Tan delta (100° C., 10% strain, 11 Hertz) | 0.124 | 0.115 | 0.117 | 0.109 | 0.130 |
| Tire Tread Predictive Wet Traction Property | | | | | |
| Rebound, 0° C. | 9.1 | 9.3 | 9.3 | 8.6 | 9.5 |
| Abrasion Resistance (Rate of abrasion) (Lower is better) | | | | | |
| Grosch abrasion[2], Medium, mg/km | 92 | 100 | 107 | 93 | 118 |
| Tear Strength[3], (peal strength) N | | | | | |
| At 95° C. for testing | 55 | 60 | 57 | 67 | 63 |

[1, 2, 3]Test procedures as in Example I

It can be seen in Table 8 that the low strain stiffness of Compound (rubber Sample) J, the control, can be significantly increased with no penalty to hysteresis as indicated by rebound and tan delta physical properties by the addition of the in situ formed resin product of methylene acceptor and methylene donor as illustrated by Compounds (rubber Samples) K and L or by using a combination of not-treated (hydrophilic) precipitated silica and silane coupling agent, together with the in situ formed resin product as illustrated by Compound (rubber Sample) N.

This is considered to be significant in a sense that it is seen that an advantage can be taken of the low hysteresis properties promoted by the pre-treated (hydrophobic) precipitated silica, while improving the low strain stiffness properties which are important for promoting for wet and dry handling tire performance for a tire tread.

EXAMPLE V

Experiments were conducted to evaluate the effect of adding short fibers to the pre-treated (pre-hydrophobated), precipitated silica in the internal rubber mixer (Banbury mixer). Compound (rubber Sample) O, the control, contained 84 phr of the pre-treated (hydrophobated) precipitated silica, whereas compounds (rubber Samples) P and Q contained 2 and 4 phr, respectively, of discrete short fibers. All of the compounds (rubber Samples) contained a total 80 phr of precipitated silica.

The basic formulation for rubber Samples O, P and Q is presented in the following Table 9 expressed in parts by weight per 100 parts of rubber (phr) unless otherwise indicated.

TABLE 9

| First Non-Productive Mixing Stage (NP1) | Parts by weight (phr) |
|---|---|
| Functionalized SBR rubber[1] | 60 |
| Natural rubber[2] | 40 |
| Pre-hydrophobated precipitated silica4 | 84, 84, 84 |
| Short Kevlar ™ aramid Fiber | 0, 2, 4 |

Ingredients used as identified in Table 1 of Example I except as may be otherwise identified and an inclusion of 2 and 4 phr of short fiber in compounds (rubber Samples) P and Q.

The following Table 10 illustrates cure behavior and various physical properties of the rubber compositions based upon the basic recipe of Table 7. Where cured rubber samples are examined, such as for the stress-strain, hot rebound and hardness values, the rubber samples were cured for about 12 minutes at a temperature of about 170° C.

TABLE 10

| | Samples (phr) | | |
|---|---|---|---|
| | O | P | Q |
| Materials (phr) | | | |
| Functionalized SBR elastomer | 60 | 60 | 60 |
| Hydrophilic (not pre-treated) precipitated silica | 0 | 5 | 10 |
| Pre-hydrophobated precipitated silica | 84 | 84 | 84 |
| Chopped fiber | 0 | 2 | 4 |
| Properties Tire Tread Predictive Handling Properties Cured Storage Modulus (G')[1] at 30° C., 10 Hertz (ARES) | | | |
| 1 percent strain (MPa) | 2263 | 2629 | 3022 |
| 10 percent strain (MPa) | 1725 | 1985 | 2232 |

TABLE 10-continued

| | Samples (phr) | | |
|---|---|---|---|
| | O | P | Q |
| Tire Tread Rolling Resistance Predictive Properties (Higher values for rebound and lower values for tan delta are predictive of beneficial reduction in tire rolling resistance) | | | |
| Rebound (100° C.) | 69 | 58 | 54 |
| Tan delta (100° C., 10% strain, 11 Hertz) | 0.097 | 0.114 | 0.109 |
| Tire Tread Predictive Wet Traction Property | | | |
| Rebound, 0° C. | 9.6 | 9.8 | 11.2 |
| Abrasion Resistance (Rate of abrasion) (Lower is better) | | | |
| Grosch abrasion[2], Medium, mg/km | 98 | 90 | 106 |
| Tear Strength[3], (peal strength) N | | | |
| At 95° C. for testing | 54 | 49 | 28 |

[1,2,3]Test procedures as in Example I except ARES test for strain stiffness

It can be seen in Table 10 that the low strain stiffness (modulus G' at 1 percent strain) of Compound (rubber Sample) O, the control, can be significantly increased with some penalty to hysteresis as indicated by rebound and tan delta properties by the addition of the short fibers (Kevlar fibers) to the compound (rubber Sample) containing pre-treated (thereby pre-hydrophobated) precipitated silica.

This is considered to be significant in a sense that it is seen that an advantage can be taken of some of the low hysteresis properties (evidenced by the rebound and tan delta properties) of the rubber composition promoted by the pre-treated (hydrophobated) precipitated silica, while improving the low strain stiffness (modulus G') properties which are important for promoting wet and dry handling tire performance for a tire tread.

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition comprised of, based upon parts by weight per 100 parts by weight of rubber (phr):
   (A) 100 phr of at least one diene-based elastomer comprised of
      a combination of organic solvent solution polymerization prepared functionalized tin coupled styrene/butadiene elastomer and at least one non-functionalized diene-based elastomer where said combination contains greater than 50 percent (by weight) of said functionalized tin coupled styrene/butadiene elastomer, and
   (B) about 30 to about 120 phr of reinforcing filler comprised of rubber reinforcing carbon black and precipitated silica comprised of a combination of pre-hydrophobated precipitated silica and added hydrophilic precipitated silica without added silica coupler;
      wherein said pre-hydrophobated precipitated silica is hydrophobated prior to its addition to the rubber composition by treatment with:
      (1) at least one of alkylsilane and alkoxysilane, or
      (2) a combination of at least one of alkylsilane and alkoxysilane together with at least one of an organoalkoxysilyl polysulfide and organomercaptoalkoxysilane, or
      (3) at least one of an organoalkoxysilyl polysulfide and organomercaptoalkoxysilane,
      wherein said additional non-functional diene-based elastomer is comprised of at least one of cis 1,4-polyisoprene, 1,4-polybutadiene and styrene/butadiene rubber; and
      wherein said functional groups for said functionalized tin coupled styrene/butadiene elastomer are comprised of a combination of thiol and siloxy functional groups reactive with hydroxyl groups on said precipitated silica.

2. A tire with tread comprised of the rubber composition of claim 1.

* * * * *